Oct. 3, 1961 R. DI PASQUALE 3,002,834
PROCESS FOR PRODUCING ELECTRODE PLATES
Filed Feb. 24, 1960

INVENTOR.
RENATO DI PASQUALE
BY
AGENT

3,002,834
PROCESS FOR PRODUCING ELECTRODE PLATES

Renato Di Pasquale, Jersey City, N.J., assignor to Yardney International Corp., New York, N.Y., a corporation of New York
Filed Feb. 24, 1960, Ser. No. 11,946
8 Claims. (Cl. 75—208)

My present invention relates to a process designed for the continuous production of plate-like bodies made from thermally fused particles, such as battery electrodes whose active material consists, for example, of sintered silver. This application is a continuation-in-part of my co-pending application Serial No. 590,524, filed June 11, 1956, now abandoned.

In U.S. application Serial No. 611,327, filed Sept. 21, 1956, by Martin E. Kagan and Frank Solomon, there has been disclosed an electrode plate in which a body of comminuted silver incorporates a framework of solid silver, the comminuted areas and the solid areas being sintered together to form a rigid mechanical and galvanical unit. An object of the present invention is to provide a simple and efficient process adapted for the mass production of plates of the general character described.

A more particular object of my invention is to provide a process for the aforesaid purpose in which the comminuted material is transformed into a finished, sintered and grid-supported plate in a single, continuous operation.

A further object of this invention is the provision of a process of this type requiring only cheap, expendable sheet material such as paper for transporting the powder during the initial stages preceding the sintering operation.

In accordance with my present invention I deposit a metallic powder (preferably of silver) in a continuous manner on a unidirectionally moving first conveyor, which may be made from expendable material as noted above, and thereupon inserting from above into the powder layer a flexible, perforated metallic strip (again preferably of silver) which, on becoming imbedded in that layer, is passed together with the powder and its supporting conveyor between pressure rollers whereby the powder is compacted around the strip and within its perforations to form a composite sheet therewith. This sheet will be sufficiently self-supporting to be capable of bridging the gap between the aforementioned first conveyor and a second conveyor of more highly heat-resistant material which carries it through a heating zone for the sinter treatment. Additional supports such as idler rollers may be provided within the inter-conveyor gap to permit compaction of the powder to lesser densities than would otherwise be required. The elongated sintered structure emerging from the heating zone is cut, preferably automatically, into segments of predetermined size to which, in the case of electrode plates, terminal leads may be attached mechanically or by a fusion process such as welding or soldering.

The invention will be further described with reference to the accompanying drawing in which.

Figure 1:
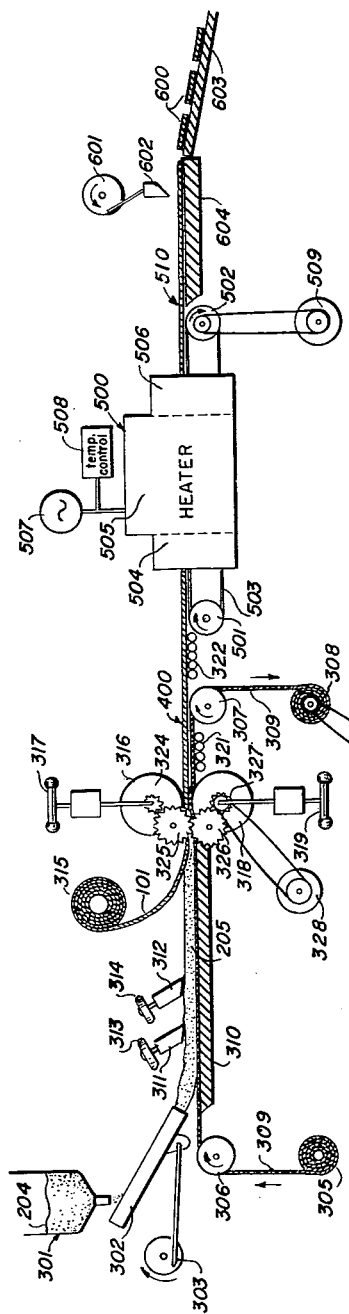
FIG. 1 is a somewhat diagrammatic side-elevational view of an apparatus for carrying out the process of the invention.

A hopper 301 feeds comminuted electrode material 204, such as silver powder, onto a chute 302 which deposits it in the form of a layer 205 onto a working surface constituted by the upper horizontal face of a continuously moving conveyor belt 309. The powder 204, with a grain diameter ranging for example between 5 and 10 microns, should be essentially of the nodular type, consisting for the most part of particles of more or less globular character with a minimum of elongated or dendritic formations. The chute 302 may be given a reciprocating motion under the control of an eccentric 303 for the purpose of better distributing the powder on the conveyor surface.

The conveyor 309 is a strip of non-porous paper of high tensile strength, non-adherent to silver powder, of smooth surface and substantially uniform thickness. Strip 309 is continuously unwound from a supply roll 305 and, after passing around deflecting rollers 306 and 307, wound upon a take-up roll 308. A stationary support 310 extends underneath the strip 309 between deflecting roller 306 and a pair of pressure rollers 316, 318 which are adjustably disposed, under the control of respective handles 317 and 319, above and below the conveyor.

Figure 2:
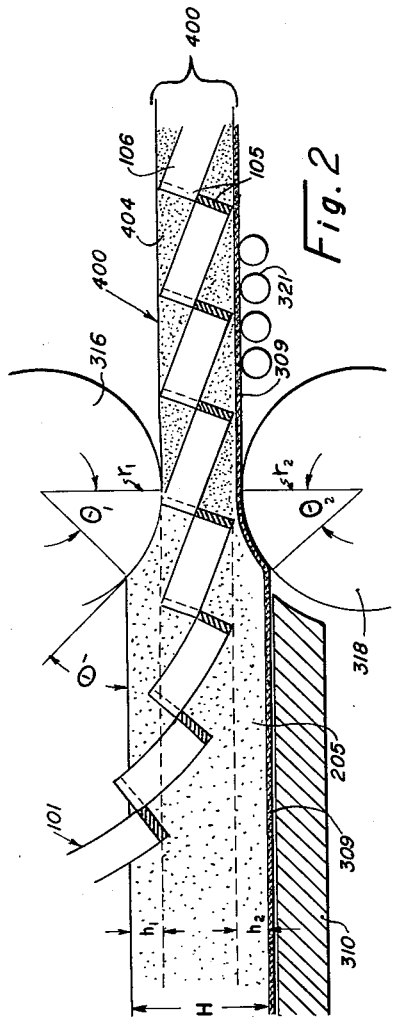
FIG. 2 is an enlarged detail view illustrating the operation of the rollers in the apparatus of FIG. 1.
Figure 3:
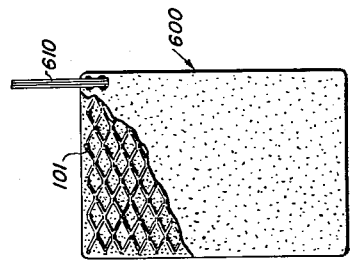
FIG. 3 shows a finished electrode (parts broken away) made by the apparatus of FIGS. 1 and 2.

A pair of doctor blades 311 and 312, adapted to be raised or lowered by means of respective handles 313 and 314, are positioned in cascade above the support 310 and determine the thickness of the powder layer 205. A grid 101, of an expanded-metal structure best seen in FIG. 3, is dispensed from a supply roll 315 and merges with the powder layer at a location between the second doctor blade 312 and the pressure rollers 316, 318. As best seen in FIG. 2, roller 318 has its periphery projecting above the supporting surface 310 and with roller 316 defines a gap whose height is approximately equal to the combined thickness of conveyor strip 309 and grid 101, being at the same time substantially less than the thickness of layer 205 as controlled by the doctor blades.

A series of idler rollers 321, inserted between pressure rollers 316, 318 and deflecting roller 307, support the strip 309 and the composite sheet 400 of reduced thickness which emerges from the pressure rollers and consists of the grid 101 and compacted powder 404 lodged in the meshes of the grid. Beyond the deflecting roller 307, where the conveyor 309 leaves the sheet 400, the latter passes over additional idler rollers 322 onto a second conveyor in the form of an endless belt 503 of heat-resisting material, such as a fine mesh of nickel-chromium-molybdenum steel. Belt 503, supported on rollers 501, 502 and driven by a motor 509, passes through a heating chamber 500 which is energized from a suitable source of energy, here shown as an alternating-current supply source 507, under the control of a regulator 508 which may be a thermosensitive impedance device responsive to the temperature of the chamber 500. As indicated in the drawing, the chamber 500 may be divided into a preheating zone 504, a main heating zone 505 and a tempering zone 506. The temperature prevailing in these zones and the travel time of the conveyor 503 therethrough are so adjusted that the composite sheet 400 is converted into a sintered sheet 510 having a porous yet rigid structure, with the particles of the powder 404 and the grid 101 firmly bonded together.

A cutting knife 602, reciprocated by an eccentric 601, works against an anvil plate 604 to divide the sheet 510 into segments 600 which are discharged over a chute 603. Each segment 600 is adapted to form the body of an electrode plate as shown in FIG. 3. Terminal leads 610 may be secured to the plate 600 by a fusion process, as by welding or soldering, although electrical contact could also be made to it by a clamping connection.

The eccentrics 303 and 601 as well as the drive motor 509 for endless belt 503 may be synchronized electrically with one another and with the drive motor 323 for conveyor strip 309 but should be mechanically independent from the latter motor, as also from the framework (not shown) upon which the supporting plate 310, the strip 309 and its rollers 305—308 are mounted. In this manner the transmission of vibrations from chute 302 and from cutter knife 602 to the powder layer 205 on conveyor 309 will be minimized, thereby insuring maximum uniformity of the porous structure of each plate 600.

The provision of a plurality of doctor blades 311, 312 in cascade, positioned progressively lower above support 310 and each inclined to the horizontal at an acute angle pointing in the direction of advance of the powder layer, has been found to give to this layer a smooth surface of substantially constant level, virtually free from ripples and mounds whose presence would result in non-uniform compression between the rollers 316 and 318. These rollers, positively coupled for synchronous rotation by a gear train 324, 325, 326, 327 which permits their relative radical displacement, are driven by a motor 328 whose speed should be such that the peripheral speed of the rollers 316, 318 is substantially equal to the linear speed of the conveyor 309.

The initial height of the powder layer 205 may be controlled by varying the size of the outlet of hopper 301, by changing the average inclination of chute 302 and/or by altering the speed of conveyors 309, 503. The inclination of the working surfaces of doctor blades 311 and 312 should not be so steep as to cause the oncoming powder to pile up ahead of these blades, thereby resulting in an uneven surface. The staggered positioning of these blades, with the lower (right-hand) edge of blade 311 disposed at a level intermediate that of the upper (right-hand) and the lower (left-hand) edge of blade 312, requires, on the other hand, a certain minimum inclination if excessive widths of the working surfaces of these blades are to be avoided. Suitable angles of inclination for both blades range between about 10° and 20°.

The degree of compression of the powder is determined by the difference between the thickness or height $H$ of the uncompressed layer 205 and the height $H-h_1-h_2$ of the compressed sheet 400 where, as is apparent from FIG. 2, $h_1=r_1(1-\cos\theta_1)$ and $h_2=r_2(1-\cos\theta_2)$, $r_1$, $r_2$ being the radii and $\theta_1$, $\theta_2$ being the angles of nip of the rollers 316 and 318, respectively. In computing the rate of compaction it is, of course, necessary to take into account the partial displacement of the powder by the introduction of the grid 101. Also, it should be noted that the particles 404 possess a certain amount of resilient recovery or "spring-back," which causes the ultimate thickness of the finished plate 600 to be slightly larger than the value $H-h_1-h_2$ mentioned above. In the selection of the radii $r_1$, $r_2$ of the compression rollers it should be considered that, for the level differences $h_1$ and $h_2$ contemplated, the angles $\theta_1$ and $\theta_2$ ought not to be so large as to cause pile-ups of the oncoming powder; in practice these angles may be somewhat larger than the maximum angles recommended for the stationary doctor blades 311 and 312 but should not exceed approximately 30°.

Furthermore, the speed of the conveyor 309 determines the speed of compaction which, in turn, must not be excessive lest the compressive force of the rollers be concentrated mostly upon the upper and lower surface regions of the powder layer. With proper conveyor speed, which may be of the order of one meter per minute, the pressure of rollers 316, 318 is transmitted throughout the full thickness of the layer and substantially uniform density results. In most cases the radial spacing of these rollers will be such that the density of the particles 404 in sheet 400 is between about two and three times that of the particles 204 in layer 205.

The sintering temperature in the central zone 505 of heater 500, when used for the treatment of silver powder, will generally range between approximately 650° and 800° C., with the outer zones 504 and 506 held at about 400° to 550° C. The transit time of the composite sheet through the heating chamber 500 should be at least several minutes. Strong, vibration-resisting plates 600 of high porosity have been produced in this manner from silver powder whose particles all pass through a screen of 60 mesh per inch (aperture size 250 microns) and about 50% of whose particles also pass through a screen of 325 mesh (44 microns).

What I claim is:

1. A process for forming a plate-shaped body of sintered metal powder with an imbedded metallic grid, comprising the steps of continuously depositing the metal powder on a uni-directionally moving first conveyor whereby a layer of said powder is formed, inserting from above into said layer a flexible, perforated metallic strip, passing said first conveyor with said layer and with said strip imbedded therein between pressure rollers whereby said powder is compacted around said strip and within the perforations thereof so as to form a composite sheet therewith, said sheet being sufficiently self-supporting to bridge a gap between said first conveyor and a second conveyor aligned with the former, deflecting said first conveyor away from said sheet at the beginning of said gap, advancing said sheet across said gap onto said second conveyor, continuously transporting said sheet on said second conveyor through a heating zone in which said powder is sintered onto said strip, and cutting the sintered sheet into sections.

2. A process for forming a plate-shaped body of sintered silver powder with an imbedded silver grid, comprising the steps of continuously depositing the silver powder on a uni-directionally moving first conveyor whereby a layer of said powder is formed, inserting from above into said layer a flexible, perforated silver strip, passing said first conveyor with said layer and with said strip imbedded therein between pressure rollers whereby said powder is compacted around said strip and within the perforations thereof so as to form a composite sheet therewith, said sheet being sufficiently self-supporting to bridge a gap between said first conveyor and a second conveyor aligned with the former, deflecting said first conveyor away from said sheet at the beginning of said gap, advancing said sheet across said gap onto said second conveyor, continuously transporting said sheet on said second conveyor through a heating zone in which said powder is sintered onto said strip, and cutting the sintered sheet into sections each containing a grid formed from said strip.

3. A process for forming a plate-shaped body of sintered metal powder with an imbedded metallic grid, comprising the steps of continuously depositing the metal powder on a uni-directionally moving paper web whereby a layer of said powder is formed, inserting from above into said layer a flexible, perforated metallic strip, passing said web with said layer and with said strip imbedded therein between pressure rollers whereby said powder is compacted around said strip and within the perforations thereof so as to form a composite sheet therewith, said sheet being sufficiently self-supporting to bridge a gap between said web and a metallic conveyor aligned with the former, deflecting said web away from said sheet at the beginning of said gap, advancing said sheet across said gap onto said metallic conveyor, continuously transporting said sheet on said metallic conveyor through a heating zone in which said powder is sintered onto said strip, and cutting the sintered sheet into sections.

4. A process for forming a plate-shaped body of sintered silver powder with an imbedded silver grid, comprising the steps of continuously depositing the silver powder on a uni-directionally moving paper web whereby a layer of said powder is formed, inserting from above into said layer a flexible, perforated silver strip, passing said web with said layer and with said strip imbedded therein between pressure rollers whereby said powder is compacted around said strip and within the perforations thereof so as to form a composite sheet therewith, said sheet being sufficiently self-supporting to bridge a gap between said web and a metallic conveyor aligned with the former, deflecting said web away from said sheet at the beginning of said gap, advancing said sheet across said gap onto said metallic conveyor, continuously transporting said sheet on said metallic conveyor through a heating zone in which said powder is sintered onto said strip, and cutting the sintered sheet into sections each containing a grid formed from said strip.

5. A process for forming a plate-shaped body of sintered metal powder with an imbedded metallic grid, comprising the steps of continuously depositing the metal powder on a uni-directionally moving first conveyor whereby a layer of said powder is formed, leveling said layer, inserting from above into said layer a flexible, perforated metallic strip, passing said first conveyor with said layer and with said strip imbedded therein between pressure rollers whereby said powder is compacted around said strip and within the perforations thereof so as to form a composite sheet therewith, said sheet being sufficiently self-supporting to bridge a gap between said first conveyor and a metallic conveyor aligned with the former, deflecting said first conveyor away from said sheet at the beginning of said gap, advancing said sheet across said gap onto said second conveyor, continuously transporting said sheet on said second conveyor through a heating zone in which said powder is sintered onto said strip, and cutting the sintered sheet into sections.

6. A process for forming a plate-shaped body of sintered silver powder with an imbedded silver grid, comprising the steps of continuously depositing the silver powder on a uni-directionally moving first conveyor whereby a layer of said powder is formed, leveling said layer, inserting from above into said layer a flexible, perforated silver strip, passing said first conveyor with said layer and with said strip imbedded therein between pressure rollers whereby said powder is compacted around said strip and within the perforations thereof so as to form a composite sheet therewith, said sheet being sufficiently self-supporting to bridge a gap between said first conveyor and a second conveyor aligned with the former, deflecting said first conveyor away from said sheet at the beginning of said gap, advancing said sheet across said gap onto said second conveyor, continuously transporting said sheet on said second conveyor through a heating zone in which said powder is sintered onto said strip, and cutting the sintered sheet into sections each containing a grid formed from said strip.

7. A process for forming a plate-shaped body of sintered metal powder with an imbedded metallic grid, comprising the steps of continuously depositing the metal powder on a uni-directionally moving paper web whereby a layer of said powder is formed, leveling said layer, inserting from above into said layer a flexible, perforated metallic strip, passing said web with said layer and with said strip imbedded therein between pressure rollers whereby said powder is compacted around said strip and within the perforations thereof so as to form a composite sheet therewith, said sheet being sufficiently self-supporting to bridge a gap between said web and a metallic conveyor aligned with the former, deflecting said web away from said sheet at the beginning of said gap, advancing said sheet across said gap onto said metallic conveyor, continuously transporting said sheet on said metallic conveyor through a heating zone in which said powder is sintered onto said strip, and cutting the sintered sheet into sections.

8. A process for forming a plate-shaped body of sintered silver powder with an imbedded silver grid, comprising the steps of continuously depositing the silver powder on a uni-directionally moving paper web whereby a layer of said powder is formed, leveling said layer, inserting from above into said layer a flexible, perforated silver strip, passing said web with said layer and with said strip imbedded therein between pressure rollers whereby said powder is compacted around said strip and within the perforations thereof so as to form a composite sheet therewith, said sheet being sufficiently self-supporting to bridge a gap between said web and a metallic conveyor aligned with the former, deflecting said web away from said sheet at the beginning of said gap, advancing said sheet across said gap onto said metallic conveyor, continuously transporting said sheet on said metallic conveyor through a heating zone in which said powder is sintered onto said strip, and cutting the sintered sheet into sections each containing a grid formed from said strip.

References Cited in the file of this patent

UNITED STATES PATENTS

| | | |
|---|---|---|
| 2,372,607 | Schwarzkopf | Mar. 27, 1945 |
| 2,681,375 | Vogt | Jan. 15, 1954 |
| 2,851,354 | Scanlan et al. | Sept. 9, 1958 |

FOREIGN PATENTS

| | | |
|---|---|---|
| 784,153 | Great Britain | Oct. 2, 1957 |